United States Patent [19]

Schuster

[11] Patent Number: 5,502,021
[45] Date of Patent: Mar. 26, 1996

[54] HIGHLY REACTIVE REAGENTS AND COMPOSITIONS FOR PURIFYING EXHAUST GASES AND WASTEWATER, PRODUCTION AND USE THEREOF

[75] Inventor: Georg Schuster, Tegernheim, Germany

[73] Assignee: Walhalla-Kalk Entwicklungs-Und Vertriebsgesellschaft, Regensburg, Germany

[21] Appl. No.: 480,029

[22] Filed: Jun. 7, 1995

Related U.S. Application Data

[63] Continuation of Ser. No. 146,436, Oct. 29, 1993, which is a continuation of Ser. No. 784,238, Oct. 29, 1991.

[30] Foreign Application Priority Data

Oct. 29, 1990 [DE] Germany .......................... 40 34 417.7

[51] Int. Cl.$^6$ ........................................ B01J 20/00
[52] U.S. Cl. .................... 502/400; 423/210; 423/220; 423/228; 423/635; 423/640
[58] Field of Search ..................... 502/400; 423/210, 423/220, 228, 635, 640; 253/378 R

[56] References Cited

U.S. PATENT DOCUMENTS

| | | | |
|---|---|---|---|
| 4,226,839 | 10/1980 | O'Neill et al. | 423/177 |
| 4,387,078 | 6/1983 | Lin | 423/244 |
| 4,427,197 | 1/1984 | Powell et al. | 423/244 |
| 4,472,370 | 9/1984 | Miyata et al. | 423/636 |
| 4,552,683 | 11/1985 | Powell et al. | 252/189 |
| 4,623,523 | 11/1986 | Abrams et al. | 423/242 |
| 4,721,582 | 1/1988 | Nelson | 252/189 |
| 5,173,279 | 12/1992 | Dumont et al. | 423/240 S |

FOREIGN PATENT DOCUMENTS

| | | | |
|---|---|---|---|
| 3716566 | 12/1988 | Germany . | |
| 3915934 | 11/1989 | Germany . | |
| 3826971 | 2/1990 | Germany . | |
| 58185458 | 10/1983 | Japan | 423/640 |
| 6096525 | 5/1985 | Japan | 423/636 |

*Primary Examiner*—Sharon Gibson
*Attorney, Agent, or Firm*—Baker, Maxham, Jester & Meador

[57] ABSTRACT

This invention concerns highly reactive reagents and compositions for purifying exhaust gases and flue gases and for purifying wastewater as well as the processes for producing same and use thereof.

The reagents and compositions are mixtures of calcium hydroxide with additives, especially clays, powdered bricks, carbon products such as coal dust and flue ash and optionally water glass which are already porous due to their special production and have a high specific surface area of up to about 200 $m^2/g$.

Using these sorbents, hydrocarbons and halogenated hydrocarbons, dioxins and furans in addition to heavy metals can be removed from exhaust gases and wastewater. Other advantages include the easy setup of the resulting products and their great safety for dumping.

17 Claims, No Drawings

HIGHLY REACTIVE REAGENTS AND COMPOSITIONS FOR PURIFYING EXHAUST GASES AND WASTEWATER, PRODUCTION AND USE THEREOF

"This is a continuation of application Ser. No. 08/146,436 filed on Oct. 29, 1993, which is a continuation of application(s) Ser. No. 07/784,238 filed on Oct. 29, 1991."

FIELD OF THE INVENTION

This invention concerns highly reactive reagents and compositions for purifying exhaust gases and flue gases, especially from combustion processes, and for purifying wastewater, as well as the production and use thereof.

BACKGROUND OF THE INVENTION

These reagents and compositions are mixtures of lime hydrate and/or calcium hydroxide with one or more additives and are characterized by an especially large specific surface area and/or an especially small particle size.

Lime hydrates with a high specific surface area of up to 40 $m^2/g$ are already known and yield higher separation results in purification of exhaust gases in comparison with the conventional commercial lime hydrates. These lime hydrates are produced by slaking lime with the help of alcohol. They have the great disadvantage that production is extremely complicated and expensive, and despite the recovery of the alcohol, a residual alcohol content remains in the product in amounts of several percent.

Lime hydrates for purification of exhaust gas are known from the literature and from German patent application publication 3,716,566. These known lime hydrates have basic, oxidizing, reducing, hydrate-forming or adsorptive properties or heavy metal binding properties. These additives are used exclusively to achieve a high reactivity, for example, in exhaust gas desulfurizing plants, without taking into account the effects of these additives on the residues from such desulfurization plants obtained after these processes. Consequently, these residues are not safe for dumping due to the leachability of certain additives. In particular, the original surface area of the mixture or components of these known mixtures is not affected by additional process measures in production.

German patent application publications 3,826,971 and 3,915,934 disclose lime products for purifying gases and exhaust gases. These lime products are produced by adding surface-active substances such as activated carbon and lignite coke or blast furnace coke, activated aluminum oxide or silica gel, to the lime or the slaking water in the production of said lime products and also adding catalytically active heavy metals such as vanadium and also heavy metal binding substances such as sodium sulfide. These products pose problems in final storage in residue dumping sites because apart from their general leachability, even when catalytically active heavy metals and heavy metal oxides are added they can also be leached out, which is especially undesirable in residual products that are to be dumped.

For example, it has been found that when activated carbon alone is added to lime hydrate, for example, binding of mercury is improved, but then substantial levels of mercury are found in the eluates of the residues.

Adding active carbon also has the great disadvantage that even when amounts of only 2 to 5% are added to the total mass of the composition, the carbon content is high enough that spontaneous ignition can occur, especially when there is an irregular distribution or pockets of high concentration are formed. There have already been several instances of this, leading to smoldering fires in silos holding such residues.

Furthermore, processes for purifying exhaust gases are known from the literature where an activated carbon reactor downstream from the main purification stage is used. There is the danger of fires also in this traditional system. In order to overcome this problem, the temperature of the flue gases would have to be lowered accordingly, which would in turn be associated with an additional energy consumption for reheating before the flue.

SUMMARY OF THE INVENTION

This invention is based on the object of providing highly reactive reagents and compositions for purifying gases and especially industrial exhaust gases and flue gases, especially from combustion processes, and also wastewater containing the same or similar pollutants as the exhaust gases, where said compositions are especially based on dried, powdered mixtures of calcium hydroxide with additives that are characterized by a high purification efficiency and safety of the reaction products for dumping, as well as processes for producing same and use thereof.

The reagents and compositions according to this invention are accessible by various methods which are also covered by the present invention. They are characterized in general by porosity and an accordingly high specific surface area.

The processes according to this invention for producing the highly reactive reagents and compositions are characterized by (Ia) slaking unslaked lime with water or aqueous suspensions of additives while introducing air or some other essentially unreactive gas or gas mixture or producing an essentially unreactive gas or gas mixture in situ during the slaking process and optionally then mixing the product with other additives, or (Ib) preparing a mixture of unslaked lime with some or all the additives and slaking the lime with water or aqueous suspensions of additives while introducing air or another essentially nonreactive gas or gas mixture or releasing an essentially nonreactive gas or gas mixture in situ during the slaking process and optionally then mixing the product with other additives, or (Ic) preparing a dry mixture of slaked lime and optionally unslaked lime with all or part of the additives, preparing an aqueous suspension from it and foaming by introducing air or another essentially nonreactive gas or gas mixture or producing an essentially nonreactive gas or gas mixture in situ, and optionally then mixing the products with other additives, or (Id) preparing an aqueous suspension or a paste of slaked lime or lime hydrate and/or all or part of the additives and foaming by introducing air or some other essentially nonreactive gas or gas mixture or generating an essentially nonreactive gas or gas mixture in situ and then mixing it with slaked or unslaked lime, and optionally then mixing the product with other additives, or (Ie) mixing dry foamed slaked lime with dry porous or foamed and/or nonporous or unfoamed additives, or (If) mixing dry slaked lime with dry porous or foamed additives and optionally also dry nonporous or unfoamed additives, and optionally drying the resulting products if a dry product was not obtained according to variants Ia, Ib, Ic or Id.

In the alternative procedures Ia, Ib, Ic and Id given above according to this invention, wet products or aqueous suspensions may be obtained and they may optionally also be used as such for wet gas purification without downstream drying and hardening steps. These compositions are also covered by the concept of this invention.

The idea of the invention is based on the surprising finding that the specific surface area of individual components or all the components or of the mixtures can be increased significantly by creating porosity with a foaming agent, especially by injecting air or other essentially inert gases or gas mixtures which can also be released in situ by chemical reactions from metals, organic or inorganic metal compounds or other organic or inorganic compounds.

Suitable foaming agents include, in addition to gases and gas mixtures that can be introduced as such into the respective suspensions, especially metals such as aluminum and zinc as well as organic and inorganic hydrides that evolve hydrogen on coming in contact with water or alkaline solutions, hydrogen peroxide or other peroxides and other compounds that release oxygen, for example, calcium hypochlorite, and carbides such as calcium carbides as well as pore-forming agents such as those known and conventionally used in the field of cement processing.

If necessary, dispersants or other surface-active agents may be added to the starting aqueous dispersions or suspensions.

In process variants Ia and Ib the pore-forming agent, if it is not gaseous, for example, if it is aluminum powder or zinc powder, may be placed in the starting mixture together with the unslaked lime, or as an alternative, it may also be added to the slaking water.

Especially in variants Ia and Ib, especially high pore-forming effects are achieved because a new phase is formed when the lime is slaked.

In variants Ic and Id where lime that has already been slaked is used as the starting material, the pore-forming effect occurs in an aqueous suspension or paste, in which case the pore-forming agent, as long as it is not a gas, may be added as a starting material together with the slaked lime and optional additives or in the water phase used to prepare the suspension or it may be incorporated into the suspension separately. The presence of a foaming agent leads to a pore-forming effect even in suspensions that already contain slaked lime. When unslaked lime is added to the suspension, a new phase is also formed simultaneously with preparation of the suspension due to the ensuing slaking process, thereby enhancing the pore-forming process.

Methods Ia, Ib, Ic and Id can be carried out by means of a suitable choice of the amount of water so as to yield a dry powdered product. Like the products of process alternatives Ie and If, these products can be used in this form or in the form of aqueous suspensions. If use of an aqueous suspension is planned, it is more favorable from the standpoint of the process engineering as well as for energy-saving reasons to produce the reagents or compositions in such a way as to yield an aqueous dispersion or suspension directly.

In process variant Ie, foamed slaked lime is used after first being rendered porous either separately in advance or in the same reactor by slaking it in the presence of one of the aforementioned pore-forming agents.

Process variants Ie and If are also based on the fact that porous additives can be used. These additives may in general already have a porosity as such and/or they can be rendered porous by treatment with a foaming or pore-forming agent.

Examples of porous or foamed additives include expanded clay, bulked silicates, aerated concrete powder, among others.

By producing the pores during the slaking process, lime hydrates or mixtures with a specific surface area of up to about 100 $m^2/g$ and especially about 25 to 40 $m^2/g$ can be achieved within the scope of this invention, whereas with unfoamed lime hydrates a specific surface area in the range of only about 16 to 18 $m^2/g$ can be achieved. Foamed mixtures of fine white lime with 10 wt. % powdered clay have a specific surface area in the range of 30 to 60 $m^2/g$, depending on the process and the amount of pore-forming agent used, for example, aluminum powder. Foamed mixtures of fine white lime with 10 wt. % clay powder and 10 wt. % activated carbon yield a specific surface area in the range of 45 to 84 $m^2/g$.

The specific surface area can be further increased by milling for special purposes.

It is not necessary according to this invention to subject the foamed mixtures to steam curing in an autoclave, for example, as in the case of German patent application publication 3,717,848, and then break up or grind the hardened products again thereafter, so that in addition to the great simplification in the production process, this also permits a significant energy saving in comparison with the state of the art. Furthermore, the reactivity is reduced by hardening in an autoclave.

Numerous additives can be added to the base material which is especially lime hydrate or fine white lime or to the water used for slaking the unslaked lime. Such additives include especially powdered clay, burnt clay, bentonites, thixotropic bentonites with a high montmorillonite content, gas concrete dust, expanded clay, ground fines from production of limestone bricks or production of yalistone (translated from the German "yalisteinherstellung"), powdered trass, trass lime, bleaching earths, cements, calcium aluminates, sodium aluminates, calcium sulfide, organic sulfides, calcium sulfite, carbonaceous sorbents such as blast furnace coke, lignite dust, activated carbon and ground or untreated flue ash from burning hard coal as well as water glass and accelerators and/or retarders of hydraulic setup such as those conventionally used in the cement industry (for example, such pore-forming substances as Addiment LP1 and LP2, foaming agents 1 TM and 4 TM or retarder VZ).

By means of a suitable selection of components with an adsorptive effect, products that can be especially easily solidified after use are obtained. According to this invention, components that in the prior state of the art were mixed with the residues from exhaust gas purification only subsequently to improve their dumping safety are now preferably used in the gas purification stage.

Cement phases such as $C_2(A,F)$ (2 $CaOxAl_2O_3$, $Fe_2O_3$) CA ($CaOxAl_2O_3$), $C_2S$ ($2CaOxSiO_2$), $C_3S$ ($3CaOxSiO_2$) and $C_3A$ ($3CaOxAl_2O_3$) as well as CSH phases from expanded concrete and sandy limestone or from the reaction of the starting components or mixtures are essential for such residues to set up and harden.

Reactive additives such as calcium aluminate and sodium aluminate have not only a solidifying effect but also a high activity in binding sulfate, fluoride and chloride, for example, in the form of ettringite, fluoroettringite or so-called Friedel's salt.

Thus, the safety of these residues for dumping is increased and the leachability of residues is minimized.

At the same time, the physical load-bearing capacity of such solidified residues is much more favorable than that of traditional gas purifying materials.

The products according to this invention may also contain calcium sulfate or the products of exhaust gas desulfurization systems that contain calcium sulfite and have a high water-binding capacity. These compounds disproportionate at high temperatures such as those prevailing in exhaust gas purification reactors to form sulfide and sulfate which are especially advantageous for the separation and precipitation of heavy metals.

The amounts of additives are preferably selected that the resulting product contains about 60 to 99 wt. % calcium hydroxide, based on dry weight, or so that the resulting product contains about 1 to 40 wt. %, preferably about 1 to 15 wt. %, additives, based on dry weight. The normal impurities content of high-grade lime hydrates is up to 5 wt. %.

Especially advantageous reagents or compositions according to this invention contain about 80 to 90 wt. % lime hydrate or calcium hydroxide and about 2 to 20 wt. % clay and/or about 0.2 to 3 wt. % activated carbon and/or 0.1 to 1 wt. % calcium sulfide, based on dry weight. Advantageously, they can also contain expanded concrete powder, preferably about 10 to 20 wt. %. The total of these components always adds up to 100 wt. %.

Drying in step II can be performed within the scope of this invention by supplying energy of any type or preferably by reaction with a suitable amount of unslaked lime.

The reagents and compositions according to this invention can be used as such for purification of gas, or they may be used in mixture with dry lime products or with so-called ready-to-use milk of lime. They are suitable for dry, semidry or wet gas purification. They may be used in reactors for exhaust gas purification and/or on downstream filters, preferably in the form of precoat layers.

In multistage exhaust gas purification systems the reagents and compositions according to this invention may be used in two or more stages. Use in mixture with sodium hydroxide, sodium carbonate or sodium bisulfite is possible, especially flue gas desulfurizing plants that operate by the wet principle.

Injection of the products according to this invention into electrostatic filters or into the gas stream before downstream heating surfaces is also advantageous, whereby in this case suitable mixtures would contain slightly abrasive substances such as $CaCO_3$ or expanded concrete powder. In addition, it is also advantageous to inject $H_2O$ immediately before or after this conditioning or into the flue gas duct immediately before or after one of the exhaust gas purification reactors, for example, an electrostatic filter at about 300° C. with reagents to separate or degrade organic pollutants, for example, to destroy dioxins, etc., in the residues, for example, mixtures of flue ash and products of exhaust gas desulfurization plants, by the influence of temperature, such as in a Hagenmaier drum. The remaining pollutants can be removed in a policing filter, for example. "Policing filter" is a special filter in exhaust gas purification plants and is translated from the German "Polizeifilter."

Due to the much higher specific surface area in comparison with traditional gas purifying materials based on lime and thus the higher reactive surface area, the separation performance can be significantly improved, especially with nonvolatile heavy metals such as mercury, arsenic, selenium, among others, and especially with hydrocarbons and halogenated hydrocarbons, especially chlorinated hydrocarbons, dioxins and furans.

Purely inorganic reagents and compositions are used to advantage in the temperature range from 0° to 1500° C., and carbonaceous products are used in a temperature range from 0° to 350° C.

The individual components and compositions in either foamed or unfoamed form may also be introduced directly into the exhaust gas stream or into the reactors and they can be introduced at locations other than the reagents and compositions according to this invention.

The reagents and compositions according to this invention can be used in principle in any reactors, for example, as a powder in fluidized bed reactors, and in granular or compacted form, for example, in traveling bed reactors, fixed bed reactors or granular bed reactors or again in fluidized bed reactors.

The reagents and compositions according to this invention may also be used in the same way for treatment of wastewater containing the same or similar pollutants as exhaust gases.

They may be used according to conventional methods by means of which the products are brought in contact with wastewater.

This invention is explained in greater detail by the following examples.

For all the tests in the following examples, the same test apparatus was used with the same procedure in principle. The apparatus consisted of two heatable chambers with a capacity of 50.3 liters and 102 liters. A synthetic exhaust gas was prepared under standard temperature and pressure conditions in the small chamber. Then both chambers were heated to the desired temperature of 150° to 200° C. The synthetic exhaust gas from the small chamber was then drawn through the respective absorbents. The pressure was equalized by hot gas from the larger surrounding chamber or in the case of the latter by room air. The exhaust tubes to the vessel with the absorbent were also heated or were in the larger vessel. Since pipes with an inside diameter of only 0.5 cm were used, the desired reaction temperature could be maintained relatively well on the absorbents.

All percentage amounts are based on weight.

Example 1

The reagent was a mixture of quicklime (CaO) with 15% clay powder and 0.5% aluminum powder (based on total weight), which was foamed and slaked With water to yield a dry powder. This yielded a reagent with a specific surface area (BET) of 33.2 $m^2/g$. BET is a method for determining the specific surface of, for example, catalysts. At 170 ±5° C., 50.3 liters of a synthetic exhaust gas with 0.4 g/liter $H_2O$, 19.8 mg/liter HCl and 3 µg/liter $HgCl_2$ were passed through 0.5 g of this material.

Of the total of 150.9 µg $HgCl_2$, 82.3% was absorbed on the mixture. This shows that clays or mixtures of clay and lime hydrate can absorb gaseous mercury compounds.

Example 2

The experimental procedure was the same as in Example 1. 0.5 g of a foamed mixture of burnt lime with 1% blast furnace coke was used as the reagent. The sorbent was prepared as in Example 1. It has a specific surface area (BET) of 43.8 $m^2/g$. Of the total of 150.9 µg $HgI_2$, 88.6% was absorbed (reaction temperature 170±5° C.).

Example 3

At 150±5° C. a synthetic gas with 150 µg $HgCl_2$ and 100 µg trichloroethylene was passed over the same reagent as in Example 2. 79.1% of the $HgCl_2$ and 87.3% of the trichloroethylene were removed. The sorbent is thus also suitable for separating organic chlorinated hydrocarbons.

Example 4

A mixture of 85% burnt lime, 13% clay powder and 2% activate carbon that was slaked and foamed with 0.5% aluminum powder, based on the total weight, was used as the reagent. The reagent had a specific surface area (BET) of 62.4 m$^2$/g. A gas mixture of 150 μg HgCl$_2$, 300 μg Hcl and 100 μg trichloroethylene plus 100 μg benzene was passed over this reagent at 200±5° C. 93.0% of the HgCl$_2$, 95.4% of the HCl, 92.2% of the trichloroethylene and 82.1% of the benzene were sorbed.

Example 5

The reagent from Example 4 was slaked and foamed. The approximately 35% suspension was applied to a blue belt filter with the help of a suction filter. 50.3 liters synthetic exhaust gas with 150 μg HgCl$_2$, 100 μg trichloroethylene and 100 μg benzene were passed through this filter with the resulting procoat layer (thickness 3 mm) at 150±5° C. 94.3% of the HgCl$_2$, 91.1% of the trichloroethylene and 79.5% of the benzene were sorbed.

Example 6

The experimental procedure was the same as in Example 1.

The reagent consisted of 85% CaO+10% bentonite+ 0.5% aluminum powder foamed with water and slaked until dry and then mixed with 5% ytong powder, which is a special expanded concrete.

The specific surface area (BET) was 65.1 m$^2$/g. 88.6% of the HgCl$_2$, 92.3% of the trichloroethylene and 69.2% of the benzene were sorbed from a synthetic exhaust gas containing 150 μg HgCl$_2$, 100 μg trichloroethylene and 100 μg benzene (see Example 5).

Example 7

The reagent of Example 6 was stirred to form a thick suspension or paste that was foamed over a frit plate with about 10 liters of air per gram of mixture. Then 5 g ytong powder were blended in homogeneously. Next the product was used for purification of exhaust gas. The reagent had a specific surface area (BET) of 73.4 m$^2$/g. 88.9% of the HgCl$_2$, 93.0% of the trichloroethylene and 66.3% of the benzene were removed by sorption from a synthetic exhaust gas containing 150 μg HgCl$_2$, 100 μg trichloroethylene and 150 μg benzene (see Example 5).

Example 8

The calcium carbonate bed (bed depth 3 to 6 mm) in a granular bed filter of a brickyard was replaced by a mixture of calcium carbonate with 20% expanded concrete granules and 3% granular coal. By using this reagent, a much greater separation of phenol, benzene and formaldehyde was achieved in comparison with exclusive use of a limestone bed. The separation of phenol amounted to 47.5%, benzene 62.3% and formaldehyde 70.1%.

What is claimed is:

1. Highly reactive reagents for purifying exhaust gases and flue gases, especially from combustion processes, and wastewater with the same or similar pollutants as in the exhaust gases based on mixtures of calcium hydroxide with additives, characterized by:

a mixture of
   (a) dry slaked lime with porous ground clay as additive; or
   (b) dry foamed slaked lime with ground clay as additive;

wherein the mixture contains about 60 to 99 wt. percent of slaked lime, based on dry weight.

2. The reagents according to claim 1, characterized in that they have a specific surface area of about 25 to 100 m$^2$/g.

3. The reagents according to either claim 1 or 2, characterized in that they contain a bentonite as clay.

4. The reagents according to either claim 1 or 2, characterized in that they contain as further additives burnt clay, expanded concrete dust, perlites, expanded clay, limestone brick powder, trass powder, trass lime, bleaching earth, cement, calcium aluminate, sodium aluminate, calcium sulfide, organic sulfides, calcium sulfite, calcium sulfate, blast furnace coke, lignite dust, activated carbon, flue ash, water glass, accelerators and/or retarders (selected from pore-forming substances Addiment LP1. LP2, 1TM).

5. The reagents according to either claim 1 or 2, characterized in that they contain one or more additives in the amount of about 1 to 40 wt. %, based on dry weight.

6. The reagents according to either claim 1 or 2, characterized in that they contain one or more additives in the amount of about 1 to 15 wt. % based on dry weight.

7. The reagents according to either claim 1 or 2, characterized by about 80 to 90 wt. % calcium hydroxide, about 2 to 20 wt. % clay and 0.1 to 1 wt. % calcium sulfide, based on dry weight, where the total weight of these components is 100 wt. %.

8. A process for producing highly reactive reagents for purifying exhaust gases and flue gases, especially from combustion processes, and wastewater with the same or similar pollutants as in the exhaust gases based on mixtures of calcium hydroxide with additives, especially according to either claim 1 or 2, characterized by:

mixing
   (a) dry slaked lime with porous ground clay as additive; or
   (b) dry throned slaked lime with ground clay as additive;

in such amounts that the resulting product contains about 60 to 99 wt. % slaked lime.

9. The process according to claim 8, characterized in that bentonites are used as clays.

10. The process according to claim 8, characterized in that a slaked lime is used which has been produced by using a foaming agent.

11. The process according to claim 8, characterized in that burnt clay, expanded concrete dust, perlite, bulked clay, limestone, brick powder, trass powder, trass lime, bleaching earth, cement, calcium aluminate, sodium aluminate, calcium sulfide, organic sulfides, calcium sulfite, calcium sulfate, carbon-containing sorbents such as especially blast furnace coke, lignite dust, activated carbon and flue ash as well as water glass, accelerators and/or retarding agents are used as further additives (selected from pore-forming substances Addiment LP1, LP2, 1TM).

12. The process according to claim 9, characterized in that burnt clay, expanded concrete dust, perlite, bulked clay, limestone, brick powder, trass powder, trass lime, bleaching earth, cement, calcium aluminate, sodium aluminate, calcium sulfide, organic sulfides, calcium sulfite, calcium sulfate, carbon-containing sorbents such as especially blast furnace coke, lignite dust, activated carbon and flue ash as well as water glass, accelerators and/or retarding agents are used as further additives (selected from pore-forming substances Addiment LP1, LP2, 1TM).

13. The process according to claim 10, characterized in that burnt clay, expanded concrete dust, perlite, bulked clay, limestone, brick powder, trass powder, trass lime, bleaching earth, cement, calcium aluminate, sodium aluminate, calcium sulfide, organic sulfides, calcium sulfite, calcium sulfate, carbon-containing sorbents such as especially blast furnace coke, lignite dust, activated carbon and flue ash as well as water glass, accelerators and/or retarding agents are used as further additives (selected from pore-forming substances Addiment LP1, LP2, 1TM).

14. The process according to claim 8, characterized in that the additives are used in amounts such that the resulting product contains about 1 to 40 wt. % additives, based on dry weight.

15. The process according to claim 11, characterized in that the additives are used in amounts such that the resulting product contains about 1 to 40 wt. % additives, based on dry weight.

16. The process according to claim 14, characterized in that the additives are used in amounts such that the resulting product contains about 1 to 15 wt. % additives, based on dry weight.

17. The process according to either claim 8, characterized in that the type and amounts of additives used are selected so that the resulting product contains about 80 to 90 wt. % calcium hydroxide, about 2 to 20 wt. % clay and 0.1 to 1 wt. % calcium sulfide, based on dry weight, where the total weight of these components is 100 wt. %.

\* \* \* \* \*